(12) United States Patent
Matsumoto

(10) Patent No.: US 6,526,218 B1
(45) Date of Patent: Feb. 25, 2003

(54) EDITING-FUNCTION-INTEGRATED REPRODUCING APPARATUS

(75) Inventor: Mutsumi Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/211,478

(22) Filed: Dec. 14, 1998

(30) Foreign Application Priority Data

Jan. 26, 1998 (JP) ............................... 10-012441
Jan. 26, 1998 (JP) ............................... 10-012442

(51) Int. Cl.[7] ................................ H04N 5/93
(52) U.S. Cl. ..................... 386/55; 386/94; 386/95
(58) Field of Search ........................ 386/46, 52, 55, 386/65, 94, 95, 125; 360/60

(56) References Cited

U.S. PATENT DOCUMENTS 6,009,234 A * 12/1999 Taira et al. ............... 386/95
6,034,832 A * 3/2000 Ichimura et al. ........... 386/94
6,064,793 A * 5/2000 Furuyama .................. 386/52
6,115,534 A * 9/2000 Cookson et al. ........... 386/94
6,212,329 B1 * 3/2001 Sugahara .................. 386/94

* cited by examiner

*Primary Examiner*—Huy Nguyen
(74) *Attorney, Agent, or Firm*—Robin, Blecker & Daley (57) ABSTRACT

An editing-function-integrated reproducing apparatus has a function of searching for a desired main information signal from a recording medium on which at least one kind of main information signal is recorded in a main information signal recording area and a management information signal including information on restriction of reproduction of the main information signal is recorded in a management information signal recording area, reproducing the searched-for main information signal and outputting the reproduced main information signal to another apparatus. Further, the reproducing apparatus is arranged to control the other apparatus to perform an editing recording operation in accordance with the registered editing program and the information on restriction of reproduction of the main information signal reproduced from the recording medium.

32 Claims, 7 Drawing Sheets

EDITING-FUNCTION-INTEGRATED REPRODUCING APPARATUS

BACKGROUND OF THE INVENTION

1. Field of the Invention

The present invention relates to an editing-function-integrated reproducing apparatus having an editing function of editing a signal recorded on a recording medium by using another apparatus which is remotely controllable, and a method for use in such a reproducing apparatus.

2. Description of Related Art

Heretofore, a dubbing editing system has been known for dubbing a video signal recorded on a recording medium such as a video tape into another apparatus such as a video tape recorder while editing the video signal.

In such a dubbing editing system, a dubbing editing operation is performed as follows. For example, when a video signal recorded on a recording medium is to be edited, a part of the video signal recorded from one desired position to another desired position on the recording medium is decided to be one cut scene. Then, a plurality of cut scenes are beforehand registered as an editing program. According to the editing program registered beforehand, video signals for the plurality of cut scenes are searched and reproduced one after another, and are supplied to another apparatus such as a video tape recorder.

Further, in recent years, a system having such a structure as to control the operation of a receiving-side video tape recorder in the following manner has been developed. A sending-side video tape recorder contains therein a transmitting part of an infrared remote-control device. Among a plurality of kinds of control command codes stored in the infrared remote-control device, control command codes for controlling the operation corresponding to the manufacturer or type of the receiving-side video tape recorder are selected. According to the control command codes as selected, a cotrol command is sent from the transmitting part of the infrared remolte-control device to the receiving-side video tape recorder during the above-mentioned dubbing editing operation so as to control the operation of the receiving-side video tape recorder.

Meanwhile, there has been recently developed a recording-and-reproducing apparatus having such a function that, in order to allow only some specific users to see or hear specific images or sounds recorded on a recording medium, reproduction-restricting information is recorded in addition to a video or audio signal corresponding to the specific images or sounds in recording the video or audio signal on a recording medium, and, then, at the time of reproduction, the reproducing action is controlled according to the presence or absence of the reproduction-restricting information so as to cause the video or audio signal having the reproduction-restricting information added thereto not to be outputted.

However, when the above-mentioned dubbing editing operation is to be performed on a recording medium on which a video or audio signal has been recorded by the above recording-and-reproducing apparatus, the following problem arises. In registering the editing program, any area of the recording medium where the reproduction-restricting information has been added to the video or audio signal would be able to be registered as a cut scene selected for editing. Therefore, if, within the editing program as registered, there is any cut scene including an area of the recording medium area where the reproduction-restricting information has been added to the video or audio signal, the video and audio signal having the reproduction-restricting information added thereto would not be outputted from a sending-side reproducing apparatus. As a result, another recording medium which is used for the dubbing editing operation for dubbing a video or audio signal into a receiving-side recording apparatus comes eventually to have a period in which no video or audio signal is recorded.

Further, in order to prevent such a period of having no record of video or audio signal in the result of the dubbing editing operation, it is necessary for the user of the dubbing editing system to pay attention to performing the following action. In registering the editing program, the user has to exclude the area of a recording medium where a video or audio signal having the reproduction-restricting information added thereto has been recorded, from a cut scene for editing. Otherwise, if the area of a recording medium where a video or audio signal having the reproduction-restricting information added thereto has been recorded has inadvertently been registered as a cut scene for editing, the user has to delete a program of the cut scene from the editing program as registered. Accordingly, the operation of registering an editing program is caused to be extremely troublesome by the presence of the reproduction-restricting information.

Further, in registering the editing program in the above dubbing editing system, in a case where position information on positions on a recording medium which is being subjected to the editing operation (i.e., time codes recorded together with a video or audio signal if the recording medium is a magnetic tape) is expected to be reproduced along with the video or audio signal from the recording medium, the position information reproduced from the recording medium is made to be registered as an editing start point or an editing end point.

In the above dubbing editing system, when registering an editing program, the user reproduces a video or audio signal recorded on the recording medium and registers the editing program by using the position information reproduced from the recording medium together with the video or audio signal while reviewing the contents of the reproduced video or audio signal. However, in a case where, to allow the contents of the video or audio signal recorded on the recording medium to be reviewed, the recording medium is subjected to a high-speed searching reproduction in which the transport speed of the recording medium is higher than that for a normal reproduction, if the position information to be reproduced from the recording medium together with the video or audio signal is reproduced only in an intermittent manner or if the position information to be reproduced from the recording medium together with the video or audio signal is caused to drop out by some reason, position information which has not been reproduced from the recording medium is interpolated by using, for example, the position information as reproduced immediately before. Therefore, the interpolated position information is not in proper correspondence to the actual recorded position on the recording medium of the reproduced video or audio signal. For example, if an editing program is registered in accordance with the interpolated position information, the editing operation cannot be carried out as desired, because the editing start point or editing end point as registered is not correctly in correspondence to the actual recorded position on the recording medium.

BRIEF SUMMARY OF THE INVENTION

It is a general object of the invention to provide an editing-function-integrated reproducing apparatus capable of solving the above-mentioned problems.

It is a more specific object of the invention to provide an editing-function-integrated reproducing apparatus capable of allowing the user to easily register an editing program without paying attention to excluding, from a cut scene for editing, any area of a recording medium where a video or audio signal having reproduction-restricting information added thereto has been recorded, and capable of carrying out a dubbing editing operation such that, even if the dubbing editing operation is performed according to the registered editing program, no period where no video or audio signal is recorded as the result of the dubbing editing operation is formed.

To attain the above objects, in accordance with an aspect of the invention, there is provided an editing-function-integrated reproducing apparatus having an editing function of editing a signal recorded on a recording medium by using another apparatus which is remotely controllable, which comprises (A) reproducing means for searching for a desired main information signal from the recording medium, reproducing the searched-for main information signal from the recording medium and outputting the reproduced main information signal to the other apparatus, the recording medium having formed therein a main information signal recording area in which the main information signal is recorded and a management information signal recording area in which a management information signal related to the main information signal is recorded, the main information signal recorded in the main information signal recording area including at least one kind of main information signal, and the management information signal recorded in the management information signal recording area including information on restriction of reproduction of the main information signal recorded in the main information signal recording area, and (B) control means for (i) controlling a searching and reproducing operation of the reproducing means such that at least one editing program in which one program is formed by designating an editing start point and an editing end point on the recording medium is registrable and the main information signal and the management information signal recorded on the recording medium are searched for and reproduced according to the editing program registered, (ii) controlling an outputting operation of the reproducing means for outputting the main information signal reproduced from the recording medium to the other apparatus according to the information on restriction of reproduction of the main information signal reproduced from the recording medium, and (iii) controlling the other apparatus to perform an editing recording operation according to the registered editing program and the information on restriction of reproduction of the main information signal reproduced from the recording medium.

It is a further object of the invention to provide an editing-function-integrated reproducing apparatus capable of allowing the user to, easily without paying attention in registering an editing program, register editing points of the editing program in accordance with position information which has proper correspondence to the actual positions on a recording medium.

To attain the above object, in accordance with another aspect of the invention, there is provided an editing-function-integrated reproducing apparatus having an editing function of editing a signal recorded on a recording medium by using another apparatus which is remotely controllable, which comprises (A) reproducing means for searching for a desired main information signal from the recording medium, reproducing the searched-for main information signal from the recording medium and outputting the reproduced main information signal to the other apparatus, the recording medium having formed therein a main information signal recording area in which the main information signal is recorded and a management information signal recording area in which a management information signal related to the main information signal is recorded, the main information signal recorded in the main information signal recording area including at least one kind of main information signal, and the management information signal recorded in the management information signal recording area including information on recording-position of the main information signal recorded in the main information signal recording area, and (B) control means for (i) controlling a searching and reproducing operation of the reproducing means such that at least one editing program in which one program is formed by designating an editing start point and an editing end point on the recording medium is registrable and the main information signal and the management information signal recorded on the recording medium are searched for and reproduced according to the editing program registered, (ii) controlling an outputting operation of the reproducing means for outputting the main information signal reproduced from the recording medium to the other apparatus according to the information on recording-position of the main information signal reproduced from the recording medium, and (iii) controlling the other apparatus to perform an editing recording operation according to the registered editing program and the information on recording-position of the main information signal reproduced from the recording medium, the control means allowing the editing program to be registered according to the information on recording-position of the main information signal included in the management information signal searched for from the recording medium at a predetermined searching speed.

These and other objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1:
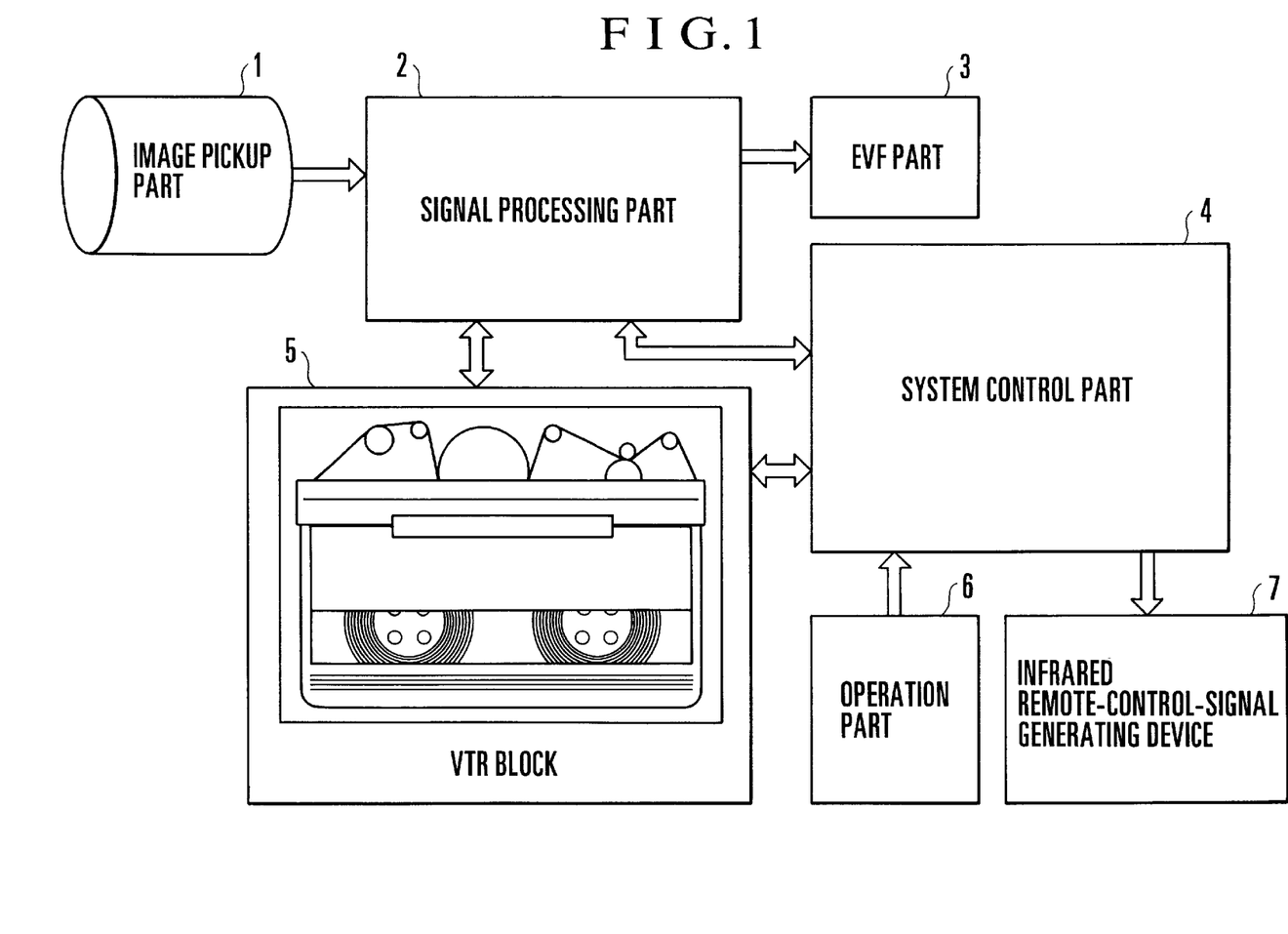
FIG. 1 is a block diagram showing in outline the arrangement of a camera-integrated type video tape recorder (VTR) according to a first embodiment of the invention.

FIG. 1 is a block diagram showing in outline the arrangement of a camera-integrated type video tape recorder (VTR) to which the invention is applied as a first embodiment thereof.

Referring to FIG. 1, an image pickup part 1 includes an image pickup optical system, an image sensor, an automatic focusing mechanism, a zooming mechanism, a sound-collecting microphone, etc, and is arranged to adjust focus and light quantity for a shooting object, to convert an optical image obtained by the image pickup optical system into a video signal, to convert a sound obtained by the sound-collecting microphone into an audio signal, and to send the video signal and the audio signal to a signal processing part 2. The signal processing part 2 is arranged to process in a predetermined manner the video and audio signals received from the image pickup part 1 and to send the processed signals to a VTR block 5. An electronic viewfinder (EVF) part 3 is provided with a CRT, liquid crystal display panel or the like for displaying a video image and is arranged to show a video image represented by the video signal processed by the signal processing part 2. The EVF part 3 also makes displays of on-screen character-and-image signals including information of varied kinds in characters and symbols related to the VTR body and a guide display for various setting actions. A system control part 4 includes a microcomputer which performs overall control over the various functions of the camera-integrated type VTR according to the first embodiment of the invention. The system control part 4 is thus arranged to control moving parts disposed within the VTR block 5, to detect position information of a magnetic tape and to control various actions. The VTR block 5 is composed of a rotary magnetic head, a transport mechanism part for transporting the magnetic tape, a driving part arranged to drive the transport mechanism part, and a servo mechanism part arranged to servo-control the driving part. The VTR block 5 is thus arranged to, in accordance with a control signal from the system control part 4, record on the magnetic tape the video signal and the audio signal processed by the signal processing part 2 or reproduce a video signal and an audio signal recorded on the magnetic tape. An operation part 6 includes among others, for example, an instruction switch for starting an editing operation, an instruction switch for stopping the magnetic tape from traveling, a switch for registering editing points, and an instruction switch for starting a reproducing operation. An infrared remote-control-signal generating device 7 is arranged to transmit a control signal received from the system control part 4, as an infrared remote-control signal for remotely controlling a receiving-side recording apparatus.

Figure 2:
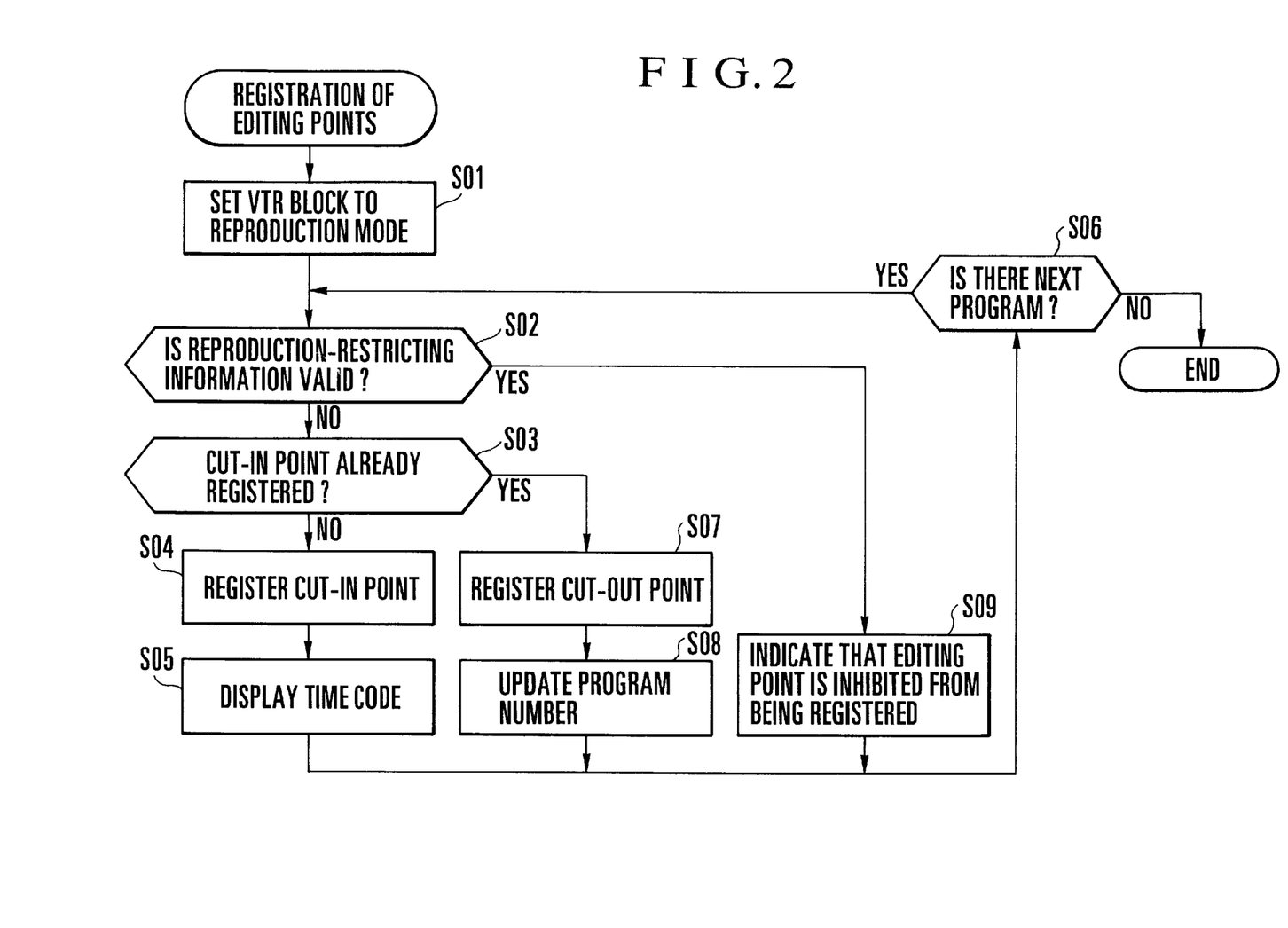
FIG. 2 is a flow chart showing a flow of control operation to be performed during registration of editing points by a microcomputer included in the camera-integrated type VTR shown in FIG. 1.

FIG. 2 is a flow chart showing a flow of control operation to be performed during registration of editing points by the microcomputer in the camera-integrated type VTR shown in FIG. 1.

Figure 3:
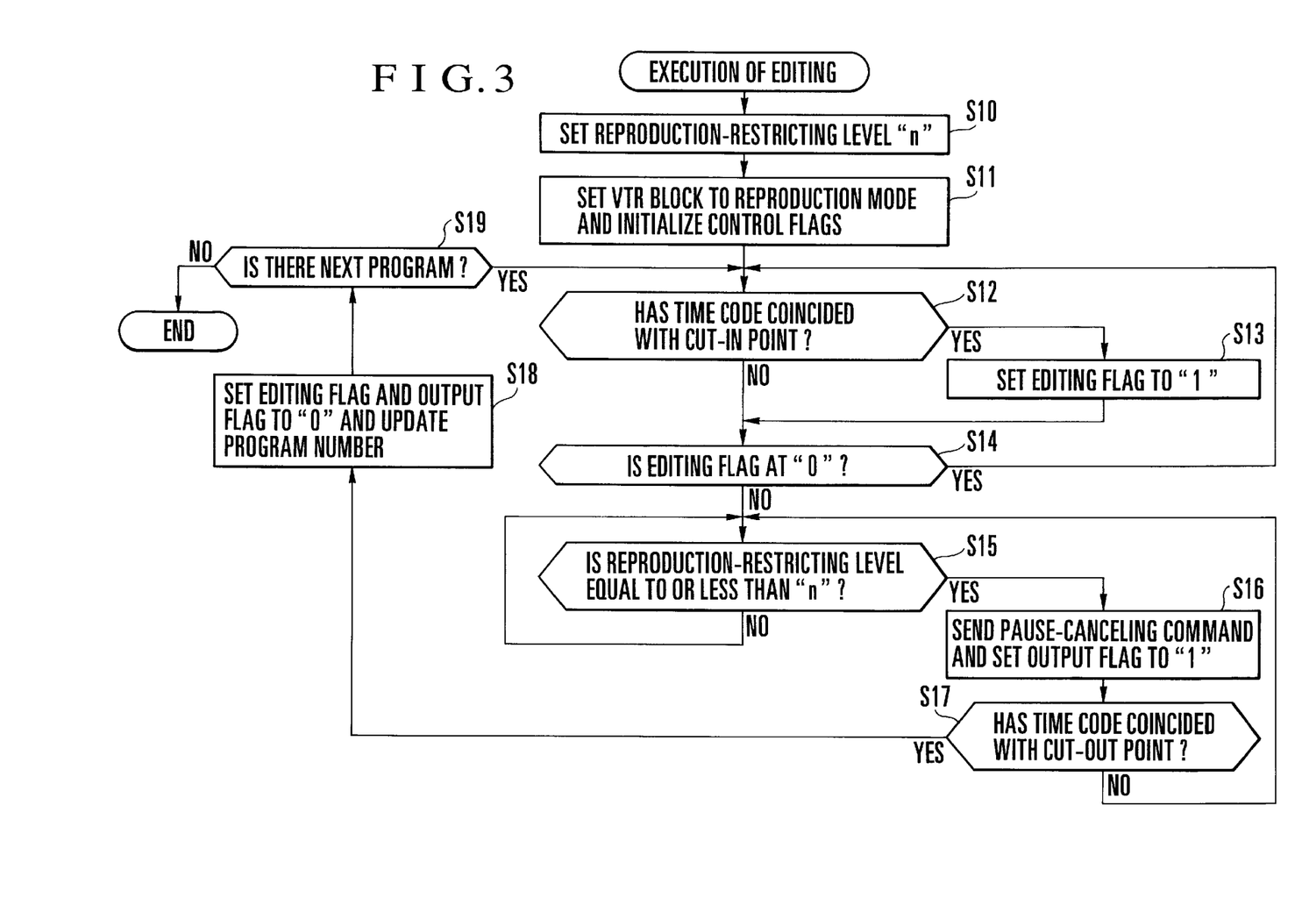
FIG. 3 is a flow chart showing a flow of control operation to be performed during execution of an editing operation by the microcomputer included in the camera-integrated type VTR shown in FIG. 1.

FIG. 3 is a flow chart showing a flow of control operation to be performed during execution of an editing operation by the microcomputer in the camera-integrated type VTR shown in FIG. 1.

FIGS. 4(a) to 4(d) show examples of displays made on the picture plane of the EVF part 3 of the camera-integrated type VTR shown in FIG. 1 during registration of editing points and during execution of an editing operation.

In the case of the camera-integrated type VTR according to the first embodiment of the invention, the video signal, and the audio signal are recorded respectively in the form of digital data. Each of a plurality of recording tracks formed when the surface of the magnetic tape is traced by the rotary magnetic head is provided with a video sector in which the video data is recorded and an audio sector in which the audio data is recorded. Further, the video sector is provided with a VAUX area for recording auxiliary information data VAUX, which is to be recorded together with the video data. The audio sector is likewise provided with an AAUX area for recording auxiliary information data AAUX, which is to be recorded together with the audio data.

In the case of the first embodiment, reproduction-restricting information data on restriction of reproduction of video or audio data is made to be set in the VAUX area or the AAUX area. More specifically, the reproduction-restricting information data (SS flag) indicative of, the restriction of reproduction of the video data is set in the VAUX area of the video sector. The reproduction-restricting information data (SS flag) indicative of the restriction of reproduction of the audio data is; set in the AAUX area of the audio sector.

In registering editing points, the camera-integrated type VTR shown in FIG. 1 operates as described below with reference to FIG. 2 which shows a control operation in a flow chart.

When the operation part 6 shown in FIG. 1 is operated by the user to instruct the system control part 4 to start the editing-point registering operation, the system control part 4 brings the VTR block 5 into a reproduction mode at a step S01. The system control part 4 is thus caused to begin to reproduce data recorded in each track on the magnetic tape. At a step S02, a check is made for detecting whether reproduction-restricting information included in the data reproduced from the magnetic tape, i.e., the reproduction-restricting information data (SS flag) indicative of the restriction of reproduction of video data or the reproduction-restricting information data (SS flag) indicative of the restriction of reproduction of audio data, is valid or invalid.

Figure 4A:
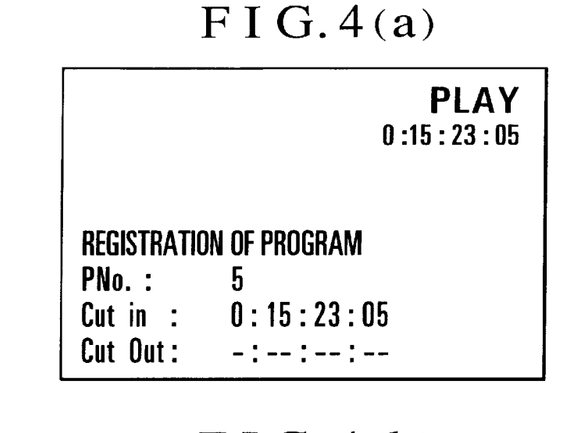
FIGS. 4(a) to 4(d) show examples of displays made on the picture plane of an EVF (electronic viewfinder) part of the camera-integrated type VTR shown in FIG. 1 during registration of editing points and during execution of an editing operation.

If the reproduction-restricting information included in the reproduced data is found at the step S02 to be invalid, the flow of operation proceeds to a step S03. At the step S03, a check is made to find if a cut-in point has already been registered. If not, the flow proceeds to a step S04 to register the cut-in point. At a step S05, a time code for the registered cut-in point is displayed on the picture plane of the EVF part 3 shown in FIG. 1, as shown in FIG. 4(a). At a step S06, a check is made to find if there is a program to be next registered. If not, the flow brings the editing-point registering operation to an end. If so, the flow returns to the step S02. In a case where the cut-in point is found at the step S03 to have already been registered, the flow proceeds to a step S07. At the step S07, a cut-out point is registered, and the flow proceeds to a step S08. At the step S08, a program number is updated for a program to be next registered. If no program to be next registered is found at the step S06, the editing-point registering operation comes to an end. If there is a program to be next registered, the flow returns to the step S02.

Figure 4B:
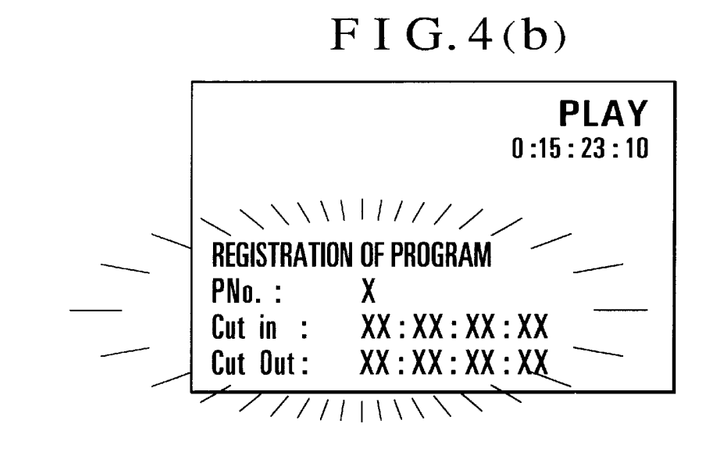

If the reproduction-restricting information as detected is found at the step S02 to be valid, the flow of operation proceeds from the step S02 to a step S09. At the step S09, in order to indicate that an area on the magnetic tape which is about to be registered as an editing point is in a state of being inhibited from being registered as the editing point (i.e., an area where a video signal or an audio signal which is restrained from reproduction is recorded is about to be registered as the editing point), a character display related to registration of the applicable program is made to flicker on the picture plane of the EVF part 3 shown in FIG. 1, as shown in FIG. 4(b). After the step S09, if there is no program to be registered next, the flow returns through the step S06 to the step S02.

The flow of operation described above enables the user to easily register an editing program without paying attention to excluding, from a cut scene for editing, an area on the recording medium where a video signal or an audio signal having the reproduction-restricting information added thereto is recorded.

Referring to FIG. 3 which is a flow chart showing a flow of control actions to be performed by the camera-integrated type VTR shown in FIG. 1 during execution of an editing operation.

In the case of the camera-integrated type VTR according to the first embodiment, a plurality of reproduction-restricting levels are set as the restriction of reproduction of video data or audio data. For example, a reproduction-restricting level to be set when both video data and audio data can be outputted to permit appreciation of images and sounds is referred to as Level 0. A reproduction-restricting level to be set when only one of video data and audio data can be outputted to permit appreciation of only one of images and sounds is referred to as Level 1. A reproduction-restricting level to be set when neither video data nor audio data is allowed to be outputted and appreciation of images and sounds is inhibited is referred to as Level 2. Reproduction-restricting information data indicative of the applicable reproduction-restricting level is set and recorded in the video area or audio area of a magnetic tape in recording video data or audio data on the magnetic tape. Then, at the commencement of execution of an editing operation on the magnetic tape subjected to the above recording, the VTR is assumed to be set into a state of performing the editing operation according to one of the reproduction-restricting levels.

Figure 4C:
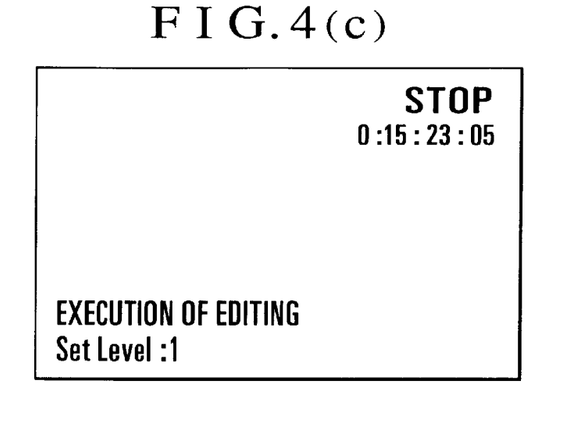
Figure 4D:
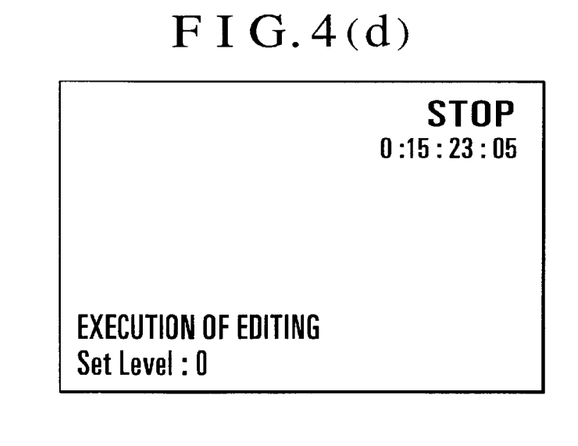

When the operation part 6 shown in FIG. 1 is operated by the user, an instruction for starting execution of the editing operation is given to the system control part 4. Then, at a step S10 of FIG. 3, the reproduction-restricting level "n" is set. The reproduction-restricting level for execution of the editing operation is displayed in characters on the picture plane of the EVF part 3 shown in FIG. 1, as shown in FIG. 4(c) or 4(d). At a step S11, the system control part 4 sets the operating mode of the VTR block 5 to a reproduction mode in which a reproducing action is performed on the magnetic tape. Then, the magnetic tape is subjected to a high-speed search reproduction until the first cut-in point registered in the editing program is found. At the same time, an infrared remote-control signal is transmitted, as a control command, from the infrared remote-control-signal generating device 7 to the other VTR which is employed as a receiving-side recording apparatus, to set the receiving-side VTR into a pause state. After that, various control flags are initialized.

In this case, the various control flags are assumed to include an editing flag which indicates the operating state of the VTR block 5 of the camera-integrated type VTR as the sending-side reproducing apparatus (i.e., whether or not the operating state of the VTR block 5 is a reproducing state), and an output flag which indicates the transmission state of the infrared remote-control signal from the infrared remote-control-signal generating device 7 to the other VTR as the receiving-side recording apparatus (i.e., whether the infrared remote-control signal indicative of a control command for setting the other VTR as the receiving-side recording apparatus into a pause state is being transmitted from the infrared remote-control-signal generating device 7, or whether the infrared remote-control signal indicative of a control command for releasing the other VTR from the pause state is being transmitted). By the initialization of the various control flags at the step S11, both the editing flag and the output flag are set to "0".

At a step S12 of FIG. 3, a check is made to find if any of time codes added to the data reproduced from the magnetic tape by the high-speed search reproduction coincides with the first cut-in point registered in the editing program. If so, the flow of operation proceeds from the step S12 to a step S13. At the step S13, the system control part 4 changes the operation mode of the VTR block 5 from the high-speed search reproduction mode to a normal reproduction mode. Then, data recorded on the magnetic tape from the first cut-in point registered in the editing program is reproduced at a normal speed, and the editing flag is set to "1". The flow then proceeds from the step S13 to a step S14. If no time code added to the data reproduced from the magnetic tape by the high-speed search reproduction is found at the step S12 to coincide with the first cut-in point, the flow proceeds from the step S12 to the step S14.

At the step S14 of FIG. 3, a check is made to find if the editing flag is at "0", which indicates that the VTR block 5 is still in process of the high-speed search reproduction, the flow returns to the step S12. If the editing flag is found at the step S14 to be at "1", which indicates that the VTR block 5 is in process of the normal reproduction, the flow proceeds from the step S14 to a step S15 to make a check for the reproduction-restricting information data included in the data reproduced from the magnetic tape.

At the step S15 of FIG. 3, the check is made to find if the reproduction-restricting level indicated by the reproduction-restricting information data included in the data reproduced from the magnetic tape is equal to or less than the reproduction-restricting level "n" set at the step S10. If not, the check at the step S15 is repeated until either the reproduction-restricting level indicated by the reproduction-restricting information data included in the data reproduced from the magnetic tape becomes equal to or less than the reproduction-restricting level "n" set at the step S10 or the reproduction-restricting information data becomes invalid. The flow then proceeds from the step S15 to a step S16. At the step S16, an infrared remote-control signal indicative of a control command for cancelling the pause state of the other VTR serving as a receiving-side recording apparatus is sent from the infrared remote-control-signal generating device 7 to the other VTR. At the same time, the output flag is set to "1", and then the flow proceeds from the step S16 to a step 17.

At the step S17 of FIG. 3, a check is made to find if a time code added to the data reproduced from the magnetic tape during the normal reproduction coincides with a cut-out point registered in the editing program. If not, the flow returns to the step S15. If so, the flow proceeds from the step S17 to a step S18.

At the step S18 of FIG. 3, the operation mode of the VTR block 5 is changed from the normal reproduction mode to the high-speed search reproduction mode. The data recorded on the magnetic tape is reproduced in the high-speed search reproduction mode up to a point corresponding to the next cut-in point registered in the editing program. At the same time, an infrared remote-control signal indicative of a control command for setting the other VTR serving as the receiving-side recording apparatus into the pause state is transmitted from the infrared remote-control-signal generating device 7 to the other VTR. Further, both the editing flag and the output flag are set to "0". Then, the program number of the editing program is updated, and the flow proceeds from the step S18 to a step S19.

At the step S19, a check is made to find if there is any program that is to be next executed. If not, the editing operation comes to an end. If so, the flow returns from the step S19 to the step S12.

By virtue of the procedures set forth as shown in the flow chart described above, in carrying out the dubbing editing operation according to a registered editing program, the operating state of the receiving-side recording apparatus is changed automatically to a non-recording state if the reproduction-restricting information which is valid is detected in the signal reproduced from a recording medium. If no valid reproduction-restricting information is detected in the signal reproduced, the receiving-side recording apparatus is automatically set in a recording state. Therefore, even if the reproduction-restricting information added to video data or audio data recorded on the recording medium is found to be valid, the dubbing editing operation can be carried out in such a way as to adequately exclude any period of having no image or no sound from the result of the dubbing editing operation. Further, in a case where a plurality of reproduction-restricting levels are set for reproduction of video or audio signals, the receiving-side recording apparatus is automatically set into a non-recording state, if a reproduction-restricting level indicated by reproduction-restricting information added to the signal reproduced from the recording medium is found to be higher than the reproduction-restricting level set at the commencement of execution of editing, and the receiving-side recording apparatus is automatically set into a recording state if the reproduction-restricting level indicated by reproduction-restricting information added to the signal reproduced from the recording medium level is found to be equal to or less than the reproduction-restricting level set at the commencement of execution of editing. The arrangement for setting a reproduction-restricting level at the commencement of editing enables the user to selectively obtain one of different results of editing as desired.

The problems of the prior art can be solved by the embodiment of the invention, as the embodiment is arranged to enable the user of the VTR to easily register an editing program without paying attention to excluding, from a cut scene included in the editing program, an area where the reproduction-restricting information is added to a video signal or an audio signal recorded on the recording medium. Further, according to the arrangement of the embodiment, an editing-function-integrated reproducing apparatus can be arranged to permit a dubbing editing operation to be carried out according to a registered editing program without a fear of forming any period during which a video signal or an audio signal is not recorded.

Figure 5:
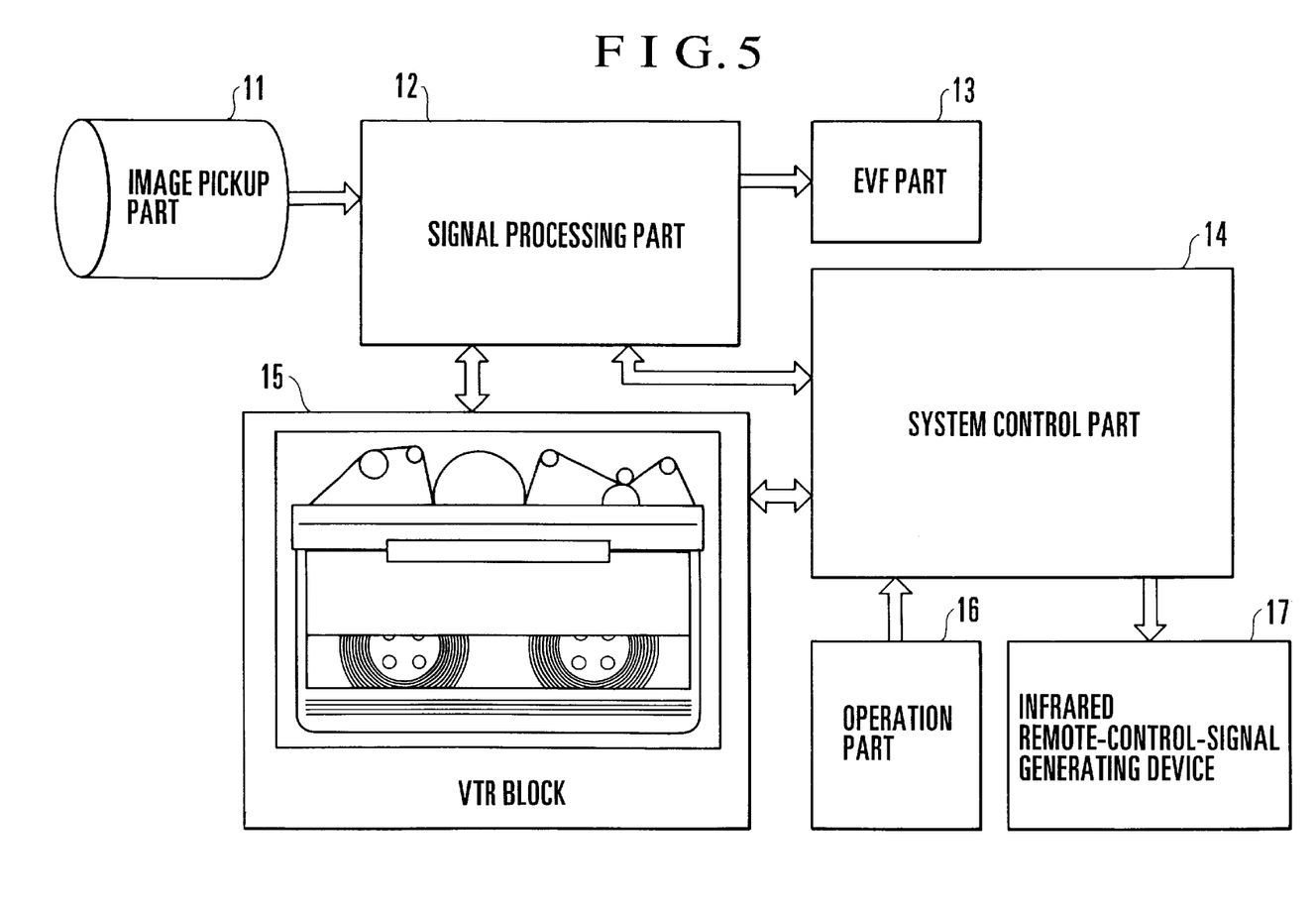
FIG. 5 is a block diagram showing in outline the arrangement of a camera-integrated type VTR according to a second embodiment of the invention.

A FIG. 5 is a block diagram showing in outline the arrangement of a camera-integrated type VTR according to a second embodiment of the invention.

Referring to FIG. 5, an image pickup part 11 includes an image pickup optical system, an image sensor, an automatic focusing mechanism, a zooming mechanism, a sound-collecting microphone, etc, and is arranged to adjust focus and light quantity for a shooting object, to convert an optical image obtained by the image pickup optical system into a video signal, to convert a sound obtained by the sound-collecting microphone into an audio signal, and to send the video signal and the audio signal to a signal processing part 12. The signal processing part 12 is arranged to process in a predetermined manner the video and audio signals received from the image pickup part 11 and to send the processed signals to a VTR block 15. An electronic viewfinder (EVF) part 13 is provided with a CRT, liquid crystal display panel or the like for displaying a video image and is arranged to show a video image represented by the video signal processed by the signal processing part 12. The EVF part 13 also makes displays of on-screen character-and-image signals including information of varied kinds in characters and symbols related to the VTR body and a guide display for various setting actions. A system control part 14 includes a microcomputer which performs overall control over the various functions of the camera-integrated type VTR according to the second embodiment of the invention. The system control part 14 is thus arranged to control moving parts disposed within the VTR block 15, to detect position information of a magnetic tape and to control various actions. The VTR block 15 is composed of a rotary magnetic head, a transport mechanism part for transporting the magnetic tape, a driving part arranged to drive the transport mechanism part, and a servo mechanism part arranged to servo-control the driving part. The VTR block 15 is thus arranged to, in accordance with a control signal from the system control part 14, record on the magnetic tape the video signal and the audio signal processed by the signal processing part 12 or reproduce a video signal and an audio signal recorded on the magnetic tape. An operation part 16 includes among others, for example, an instruction switch for starting an editing operation, an instruction switch for stopping the magnetic tape from traveling, a switch for registering editing points, an instruction switch for a reproduction mode, an instruction switch for designating a reproduction speed which is ⅕ of a normal speed, and an instruction switch for designating another reproduction speed which is 10 times higher than the normal speed. An infrared remote-control-signal generating device 17 is arranged to transmit a control signal received from the system control part 14, as an infrared remote-control signal for remotely controlling a receiving-side recording apparatus.

Figure 6:
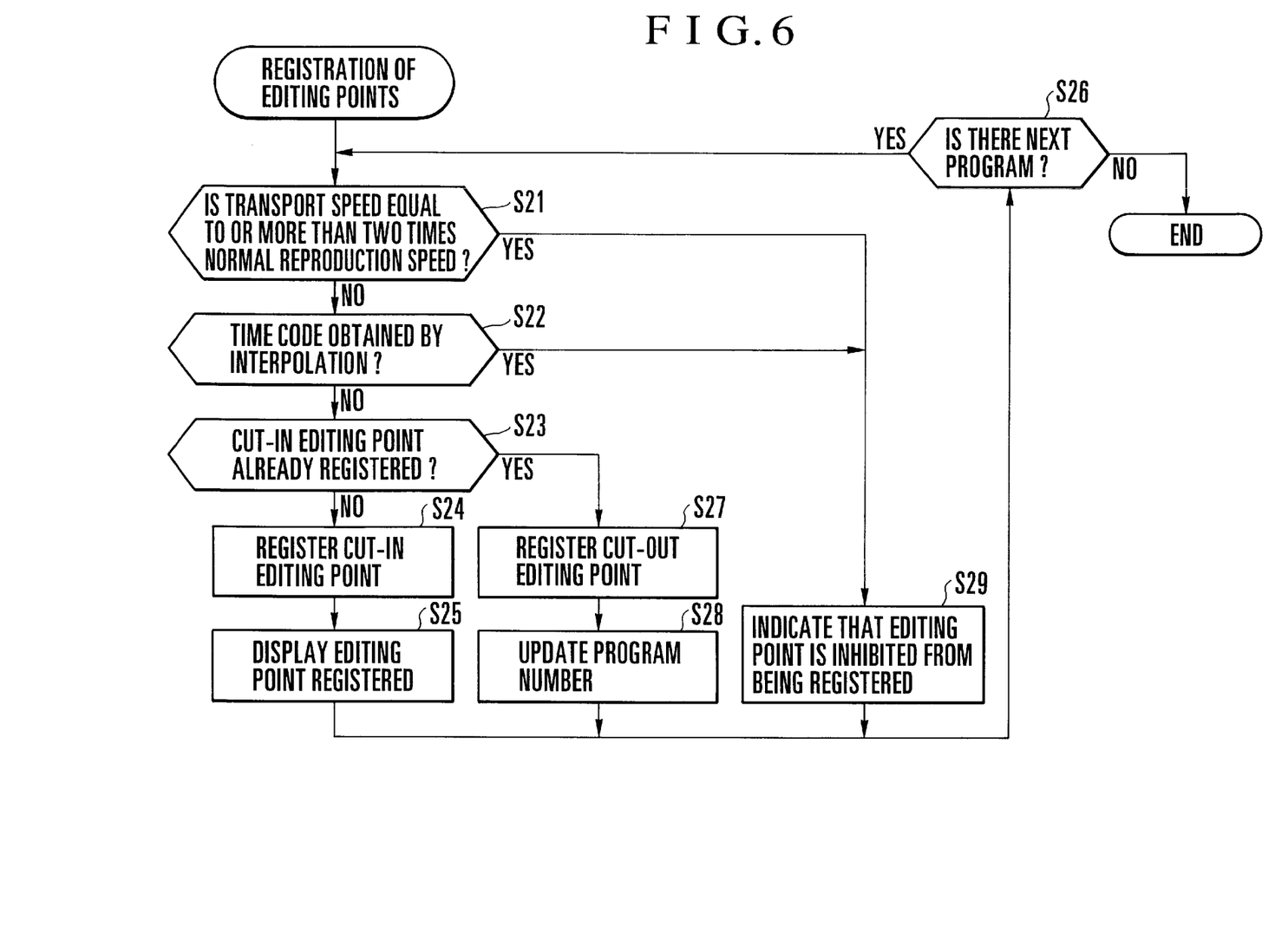
FIG. 6 is a flow chart showing a flow of control operation to be performed during registration of editing points by a microcomputer included in the camera-integrated type VTR shown in FIG. 5.

FIG. 6 is a flow chart showing the flow of a control operation of the microcomputer to be performed by the camera-integrated type VTR shown in FIG. 5 during registration of editing points.

FIGS. 7(a) to 7(d) show examples of displays made on the display picture plane of the EVF part 13 of the camera-integrated type VTR shown in FIG. 5 during registration of editing points.

A magnetic tape to be subjected to a programmed editing operation on the camera-integrated type video tape recorder according to the second embodiment of the invention has a plurality of tracks formed by tracing the surface of the magnetic tape with a rotary magnetic head. Each of these tracks includes an area where a video signal and an audio signal are recorded and another area where a time code is recorded as tape position information.

In the case of the second embodiment, a cut-in editing point (a start point of a part where a necessary video or audio signal is recorded on the magnetic tape) and a cut-out editing point (an end point of the part where the necessary video or audio signal is recorded) of each of editing programs are registered by using time codes reproduced from the magnetic tape.

In some cases, however, the time codes are not reproduced in a normal manner or not continuously obtained due to a dropout, an external noise or the like taking place during the process of the reproduction from the magnetic tape. In some other cases, the time codes are obtained only in an intermittent manner as some of time codes of each track fail to be reproduced when the magnetic tape is transported at a speed different from a normal reproduction speed. Therefore, the microcomputer of the system control part 14 shown in FIG. 5 is arranged to execute, in such a case, an interpolation process to interpolate any defective time code that is not normally reproduced, for example, with another time code normally reproduced immediately before the defective time code. A time code that is thus interpolated is temporarily held at a memory within the microcomputer by adding thereto a flag which indicates that the time code is an interpolated time code.

In registering the editing points, the camera-integrated type VTR shown in FIG. 5 operates as described below.

When the operation part 16 shown in FIG. 5 is operated to instruct the system control part 14 to start the editing-point registering operation, the system control part 14 sets the VTR block 15 into a reproduction mode. A reproducing action then begins to reproduce signals recorded in each track on the magnetic tape.

With the VTR block 15 set into the reproduction mode by operating the reproduction mode instructing switch of the operation part 16, when the ⅕-speed reproduction mode instructing switch or the 10-times-high speed reproduction mode instructing switch or the like of the operation part 16 is operated, the tape transport speed of the VTR block 15 is changed from a normal magnetic tape transport speed for reproduction to a different transport speed. Further, when a fast tape-feeding switch or a tape rewinding switch of the operation part 16 is operated, the tape transport speed of the VTR block 15 also changes from the speed for the normal reproduction, irrespectively of any operation on the reproduction mode instructing switch of the operation part 16.

As described above, the system control part 14 detects the time codes indicative of position information of the magnetic tape, included in the signal reproduced from the magnetic tape. After that, according to the time codes detected, the system control part 14 displays information on the position information of the magnetic tape and registers editing points of editing programs.

The operation of the camera-integrated type VTR shown in FIG. 5 to be performed during registration of editing points is described below with reference to FIG. 6 which is a flow chart showing a flow of control actions.

At a step S21 of FIG. 6, a check is made to find if the magnetic tape transporting speed of the VTR block 15 is equal to or more than two times the tape transport speed for the normal reproduction. If so, the flow of operation proceeds from the step S21 to a step S29. If not, the flow proceeds to a step S22. At the step S22, a check is made to find if the time code temporarily held at a memory within the microcomputer of the system control part 14 is an interpolated time code or a time code normally reproduced from the magnetic tape. If the time code is found to be an interpolated time code, the flow proceeds from the step S22 to the step S29. If the time code is found to be a normally reproduced time code, the flow proceeds to a step S23.

Figure 7A:
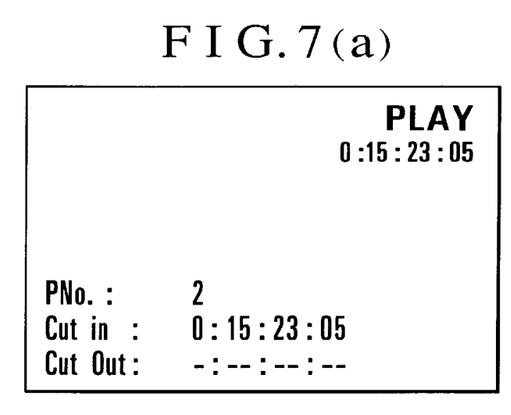
FIGS. 7(a) to 7(d) show examples of displays made on the picture plane of an EVF (electronic viewfinder) of the camera-integrated type VTR shown in FIG. 5 during registration of editing points and during execution of an editing operation.

At the step S23 of FIG. 6, a check is made to find if a cut-in editing point has already been registered. If not, the flow proceeds to a step S24 to register the cut-in editing point. At a step S25, a time code for the registered cut-in editing point is displayed on the picture plane of the EVF part 13 shown in FIG. 5, as shown in FIG. 7(*a*). The flow proceeds from the step S25 to a step S26 to make a check to find if there is a program to be next registered. If so, the flow returns to the step S21. If the cut-in editing point is found at the step S23 to have already been registered, the flow proceeds to a step 527. At the step 527, a cut-out editing point is registered, and the flow proceeds to a step S28. At the step S28, a program number is updated for a program to be next registered. If no program to be next registered is found at the step S26, the editing-point registering operation comes to an end.

If the magnetic tape transport speed is found at the step S21 to be equal to or more than two times the normal reproduction speed, or if the time code which is temporarily held at the memory within the microcomputer of the system control part 14 is found at the step S22 to be an interpolated time code, the flow of operation proceeds from the step S21 or S22 to the step S29. At the step S29, a character display related to registration of the applicable program is made to flicker on the picture plane of the EVF part 3 to indicate that a position on the magnetic tape which is currently intended to be registered as an editing point is inhibited from being registered as an editing point. In other words, a warning is given against registering the interpolated time code as an editing point. After the step S29, if there is no program to be registered next, the flow returns to the step S21.

Then, when the editing start instruction switch of the operation part 16 shown in FIG. 5 is operated to instruct the system control part 14 to begin the execution of an editing operation, the editing operation starts in accordance with the editing program registered in the above-stated manner. The VTR block 15 is set into a reproduction mode for a reproducing action on the magnetic tape. The magnetic tape is subjected to a high-speed search reproducing process to be moved up to the first cut-in editing point registered. Then, an infrared remote-control signal for bringing the receiving-side other VTR into a pause state is sent from the infrared remote-control-signal generating device 17 to the other VTR to set the other VTR into the pause state. When a time code reproduced from the magnetic tape by the high-speed-search reproduction process comes to coincide with the first registered cut-in editing point, the operation mode of the VTR block 15 is changed from the high-speed search reproduction mode to the normal reproduction mode. The signal recorded on the magnetic tape is reproduced from the magnetic tape at a normal speed of reproduction beginning at a part corresponding to the first cut-in editing point registered in the editing program. Meanwhile, the infrared remote-control-signal generating device 17 is caused to send, to the receiving-side other VTR, an infrared remote-control signal indicative of a control command for releasing the other VTR from the pause state. When a time code reproduced from the magnetic tape by normal reproduction comes to coincide with a cut-out editing point registered in the editing program, the mode of operation of the VTR block 15 is changed from the normal reproduction mode to the high-speed search reproduction mode. Then, the infrared remote-control-signal generating device 17 is caused to send to the receiving-side other VTR an infrared remote-control signal indicative of a control command for bringing the other VTR into the pause state. The magnetic tape is then subjected to the high-speed search reproduction process to be moved up to a part corresponding to the next cut-in editing point registered in the editing program. The infrared remote-control-signal generating device 17 is caused to send to the receiving-side other VTR the infrared remote-control signal indicative of a control command for bringing the other VTR into the pause state. After that, the actions mentioned above are repeated until all editing programs are finished. The editing operation comes to an end when there is left no program to be executed.

As apparent from the description given above, the cut-in and cut-out editing points of each editing program are registered by the user of the VTR while the user is watching, for confirmation, the video and audio records reproduced from the magnetic tape. However, if any of the time codes to be used for registering the editing points is an interpolated time point, as mentioned above, a point on the magnetic tape represented by the timecode used for registration is not adequately in correspondence to an actual point of the magnetic tape where the signals corresponding to the images and sounds confirmed by the user are recorded. In the event of such a time code, therefore, it is hardly possible to carry out the editing operation to obtain any desired result of editing.

Figure 7B:
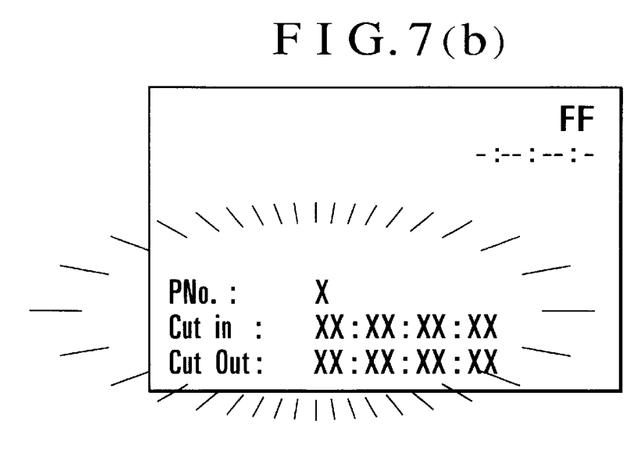
Figure 7C:
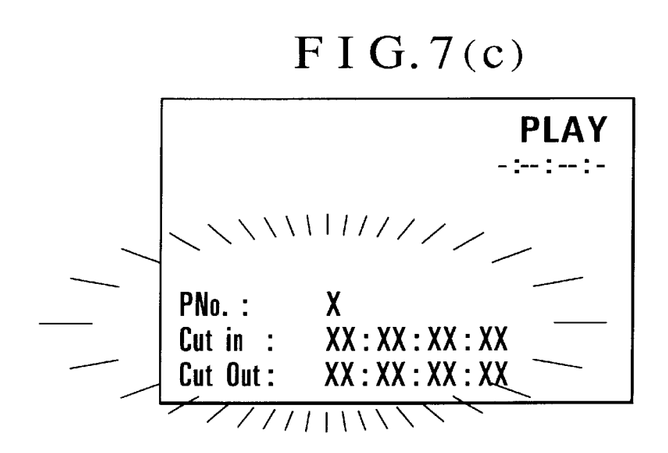
Figure 7D:
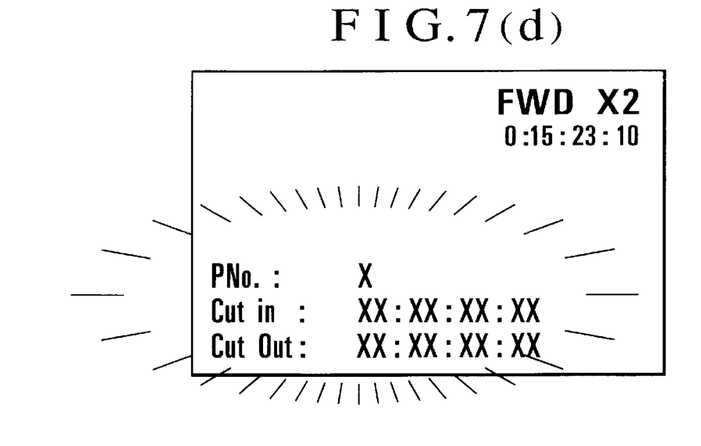

To solve this problem, the camera-integrated type VTR described above according to the second embodiment of the invention is arranged to inhibit registration of any editing point in cases where the magnetic tape transport speed is higher than the speed for normal reproduction by two times or more than two times and where a time code to be registered as an editing point is an interpolated time code. In addition to that, in such a case, the VTR is arranged to inform the user of the inhibited state with a warning display. The warning is given either by showing the inhibited state on the picture plane of the EVF part 13 shown in FIG. 5 or by causing an external video output to output a video signal with characters indicating the registration inhibited state superimposed on the video signal, as shown in FIGS. 7(b) to 7(d). That arrangement enables the user to easily know that the time code in question is in the state of being inhibited from registration. Therefore, in the event of any defective time code that is inadequately in correspondence to a position where a signal corresponding to an image or sound to be edited is actually recorded on the magnetic tape, such a defective time code can be effectively prevented from being inadvertently registered as an editing point. The arrangement disclosed thus enhances the operability of the reproducing apparatus.

As apparent from the description given above, the problems of the prior art mentioned in the foregoing can be solved by the arrangement of each embodiment disclosed. In registering an editing program, the arrangement disclosed enables the user to easily register the editing points of the editing program which are well in correspondence to the actual record position on the recording medium. According to the invention, an editing-function-integrated reproducing apparatus, therefore, can be arranged to permit the user to accurately and easily carry out the editing operation as desired.

What is claimed is:

1. A reproducing apparatus having an editing function of editing information recorded on a recording medium by using another apparatus remotely controllable, said reproducing apparatus comprising:

(A) reproducing means for reproducing from said recording medium a main information signal and a management information signal related to the main information signal and including restriction information for restricting reproduction of the main information signal, and outputting the main information signal to the other apparatus; and (B) control means for controlling a reproduction operation of said reproducing means to search and reproduce the main information signal and the management information signal from said recording medium according to an editing program, so as to control an outputting operation of said reproducing means and a recording operation of the other apparatus according to the restriction information reproduced from the recording medium.

2. A reproducing apparatus according to claim 1, wherein said control means detects whether the restriction information related to the main information signal of a period from an editing start point to an editing end point designated by the editing program to be registered is valid and, if the restriction information is valid, inhibits the editing program from being registered.

3. A reproducing apparatus according to claim 1, wherein said control means detects whether the restriction information related to the main information signal of a period from an editing start point to an editing end point designated by the editing program to be registered is valid and, if the restriction information is valid, warns an operator of said reproducing apparatus that the editing program is not registrable.

4. A reproducing apparatus according to claim 1, wherein the restriction information indicating whether the restriction of reproduction of the main information signal is valid or invalid.

5. A reproducing apparatus according to claim 1, wherein, during process of an editing operation, said control means detects whether the restriction information is valid, and controls said reproducing means such that if the restriction information is valid, the outputting operation of said reproducing means for outputting the main information signal to the other apparatus is inhibited and, if the restriction information is invalid, the outputting operation of said reproducing means for outputting the main information signal to the other apparatus is allowed.

6. A reproducing apparatus according to claim 1, wherein, during process of an editing operation, said control means detects whether the restriction information is valid, and controls the other apparatus such that, if the restriction information is valid, an editing recording operation of the other apparatus is inhibited and, if the restriction information is invalid, the editing recording operation of the other apparatus is allowed.

7. A reproducing apparatus according to claim 1, wherein, in a case where a plurality of levels are set for the restriction of reproduction of the main information signal, the restriction information indicates the level of the restriction of reproduction of the main information signal.

8. A reproducing apparatus according to claim 7, wherein, prior to execution of an editing operation, said control means sets the level of the restriction of reproduction of the main information signal and, during process of the editing operation, said control means inhibits the outputting operation of said reproducing means for outputting the main information signal to the other apparatus, if the level of the restriction of reproduction indicated by the restriction information is higher than the set level of the restriction of reproduction, and allows the outputting operation of said reproducing means for outputting the main information signal to the other apparatus, if the level of the restriction of reproduction indicated by the restriction information is equal to or lower than the set level of the restriction of reproduction.

9. A reproducing apparatus according to claim 7, wherein, prior to execution of an editing operation, said control means sets the level of the restriction of reproduction of the main information signal, and, during process of the editing operation, said control means inhibits the editing recording operation of the other apparatus, if the level of the restriction of reproduction indicated by the restriction information is higher than the set level of the restriction of reproduction, and allows the editing recording operation of the other apparatus, if the level of the restriction of reproduction indicated by the restriction information is equal to or lower than the set level of the restriction of reproduction.

10. A reproducing apparatus according to claim 1, further comprising remote-control means for selecting, from among a plurality of kinds of remote-control codes corresponding respectively to a plurality of kinds of other apparatuses which are remotely controllable, a remote-control code corresponding to the other apparatus actually used for an editing operation, and for transmitting to the actually-used other apparatus a remote control signal according to the selected remote-control code to remotely control an editing recording operation of the actually-used other apparatus.

11. A reproducing apparatus according to claim 10, wherein said remote-control means uses infrared light for carrying the remote-control signal to be transmitted to the actually-used other apparatus.

12. A reproducing apparatus according to claim 1, wherein the recording medium includes a tape-shaped recording medium.

13. A reproducing apparatus according to claim 1, wherein the recording medium includes a disk-shaped recording medium.

14. A reproducing method using an editing function, comprising the steps of:
   a reproducing step of reproducing from a recording medium a main information signal and a management information signal related to the main information signal, which includes restriction information for restricting reproduction of the main information signal;
   an output step of outputting the main information signal reproduced from said recording medium to another apparatus; and
   a control step of controlling a reproducing operation to search and reproduce the main information signal and the management information signal from said recording medium according to an editing program, so as to control an outputting operation of the main information signal and a recording operation of the other apparatus according to the restriction information reproduced from said recording medium.

15. A reproducing method according to claim 14, further comprising a detecting step of detecting whether the restriction information related to the main information signal of a period from an editing start point to an editing end point designated by the editing program is valid, wherein the control step of inhibiting the outputting operation of the main information signal, if the restriction information is valid from a result of the detecting step.

16. A reproducing method according to claim 14, further comprising a detecting step of detecting whether the restriction information related to the main information signal of a period from an editing start point to an editing end point designated by the editing program is valid, wherein the control step of inhibiting the recording operation of the other apparatus, if the restriction information is valid from a result of the detecting step.

17. A reproducing method according to claim 14, wherein, in a case where a plurality of levels are set for the restriction of reproduction of the main information signal, the restriction information indicates of the level of the restriction of reproduction of the main information signal.

18. A reproducing method according to claim 17, further comprising a registering step of enabling to set the level of the restriction of reproduction of the main information signal, wherein during process of a editing operation, the control step of inhibiting the outputting operation of the main information signal to the other apparatus, if the level of the restriction of reproduction indicated by the restriction information is higher than the set level of the restriction of reproduction, and allowing the outputting operation of the main information signal to the other apparatus, if the level of the restriction of reproduction indicated by the restriction information is equal to or lower than the set level of the restriction of reproduction.

19. A reproducing method according to claim 17, further comprising a registering step of enabling to set the level of the restriction of reproduction of the main information signal, wherein during process of a editing operation, the control step of inhibiting the recording operation of the other apparatus, if the level of the restriction of reproduction indicated by the restriction information is higher than the set level of the restriction of reproduction, and allowing the recording operation of the other apparatus, if the level of the restriction of reproduction indicated by the restriction information is equal to or lower than the set level of the restriction of reproduction.

20. A reproducing method according to claim 14, further comprising a remote-control step for selecting, from among a plurality of kinds of remote control codes corresponding respectively to a plurality of kinds of other apparatus which are remotely controllable, a remote-control code corresponding to the other apparatus actually used for an editing operation, and for transmitting to the actually-used other apparatus a remote control signal according to the selected remote-control code to remotely control an editing recording operation of the actually-used other apparatus.

21. A reproducing apparatus having an editing function comprising:
   reproducing means for reproducing from a recording medium a main information signal and a management information signal related to the main information signal and including restriction information for restricting reproduction of the main information signal, and outputting the main information signal to other apparatus;
   command transmitting means for transmitting editing commands according to an editing program and the restriction information to said other apparatus; and
   control means for controlling a reproducing operation of said reproducing means to search and reproduce the main information signal and the management information signal from said recording medium according to the editing program, controlling an outputting operation of said reproducing means according to the restriction information reproduced from said recording medium, and controlling said command transmitting means for controlling said other apparatus so as to perform a recording operation of the main information signal according to the editing program and the restriction information.

22. A reproducing apparatus according to claim 21, further comprising detecting means for detecting whether the restriction information to the main information signal of a period from an editing start point to an editing end point designated by the editing program is valid, wherein said control means for inhibiting the outputting operation of the main information signal, if the restriction information is valid from a result of said detecting means.

23. A reproducing apparatus according to claim 21, further comprising detecting means for detecting whether the restriction information related to the main information signal of a period from an editing start point to an editing end point designated by the editing program is valid, wherein said control means for inhibiting the recording operation of the other apparatus through said command transmitting means, if the restriction information is valid from a result of said detecting means.

24. A reproducing method using an editing function, comprising the steps of:

a reproducing step of reproducing from a recording a main information signal and a management information signal related to the main information signal and including restriction information for restricting reproduction of the main information signal, and outputting the main information signal to other apparatus;

a command transmitting step of transmitting editing commands according to an editing program and the restriction information to said other apparatus; and a control step of controlling a reproducing operation to search and reproduce the main information signal and the management information signal from said recording medium according to the editing program, controlling an outputting operation of the main informational signal according to the restriction information reproduced from said recording medium, and controlling a command transmitting operation to control said other apparatus so as to perform a recording operation of the main information signal according to the editing program and the restriction information.

25. A reproducing method according to claim 24, further comprising a detecting step of detecting whether the restriction information related to the main information signal of a period from an editing start point to an editing end point designated by the editing program is valid, wherein said control step of inhibiting the outputting operation of the main information signal, if the restriction information is valid from a result of the detecting means.

26. A reproducing method according to claim 24, further comprising a detecting step of detecting whether the restriction information related to the main information signal of a period from an editing start point to an editing end point designated by the editing program is valid, wherein said control step of inhibiting the recording operation of the other apparatus through the command transmitting step, if the restriction information is valid from a result of the detecting step.

27. An editing system including a reproducing apparatus and a recording apparatus, comprising:

reproducing means, arranged in said reproducing apparatus, for reproducing from a recording medium a main information signal and a management information signal related to the main information signal and including restriction information for restricting reproduction of the main information signal, and outputting the main information signal to said recording apparatus;

command transmitting means, arranged in said reproducing apparatus, for transmitting editing commands according to an editing program and the restriction information to said recording apparatus; and control means, arranged in said reproducing apparatus, for controlling a reproducing operation of said reproducing means to search and reproduce the main information signal and the management information signal from said recording medium according to the editing program, controlling an outputting operation of said reproducing means according to the restriction information reproduced from said recording medium, and controlling said command transmitting means for controlling said recording apparatus so as to perform a recording operation of the main information signal according to the editing program and the restriction information.

28. An editing system according to claim 27, further comprising detecting means, in said reproducing apparats, for detecting whether the restriction information related to the main information signal of a period from an editing start point to an editing end point designated by the editing program is valid, wherein said control means for inhibiting the outputting operation of the main information signal if the restriction information is valid from a result of said detecting means.

29. An editing system according to claim 27, further comprising detecting means, in said reproducing apparatus, for detecting whether the restriction information related to the main information signal of a period from an editing start point to an editing end point designated by the editing program is valid, wherein said control means for inhibiting the recording operation of the other apparatus through said command transmitting mean, if the restriction information is valid from a result of said detecting means.

30. An editing method for a reproducing apparatus and a recording apparats, comprising the steps of:

a reproducing step of reproducing, from a recording medium in said reproducing apparatus, a main information signal and a management information signal related to the main information signal and including restriction information for restricting reproduction of the main information signal and outputting the main information signal to said recording apparatus;

a command transmitting step of transmitting editing commands from said reproducing apparatus to said recording apparatus according to an editing program and the restriction information; and a control step of controlling a reproducing operation to search and reproduce the main information signal and the management information signal from said recording medium in said reproducing apparatus according to the editing program, controlling an outputting operation of the main information signal according to the restriction information reproduced from said recording medium, and controlling a recording operation of said recording apparatus through the command transmitting step so as to perform a recording operation of the main information signal.

31. An editing method according to claim 30, further comprising a detecting step of detecting whether the restriction information related to the main information signal of a period from an editing start point to an editing end point designated by the editing program is valid, wherein the control step of inhibiting the outputting operation of the main information signal, if the restriction information is valid from a result of the detecting step.

32. An editing method according to claim 30, further comprising a detecting step of detecting whether the restriction information related to the main information signal of a period from an editing start point to an editing end point designated by the editing program is valid, wherein the control step of inhibiting the recording operation of said recording apparatus through the command transmitting step, if the restriction information is valid from a result of the detecting step.

* * * * *

UNITED STATES PATENT AND TRADEMARK OFFICE
CERTIFICATE OF CORRECTION

PATENT NO. : 6,526,218 B1
DATED : February 25, 2003
INVENTOR(S) : Mutsumi Matsumoto It is certified that error appears in the above-identified patent and that said Letters Patent is hereby corrected as shown below:

Column 1,
Line 40, delete "remolte-control" and insert -- remote control --.

Column 8,
Line 59, delete "17" and insert -- S17 --.

Column 9,
Line 62, before "FIG. 5" delete "A".

Column 12,
Line 11, delete "step 527. At the step 527," and insert -- step S27. At the step S27, --.

Signed and Sealed this

First Day of June, 2004

JON W. DUDAS
*Acting Director of the United States Patent and Trademark Office*